(12) United States Patent
Kowalski (10) Patent No.: US 9,357,789 B2
(45) Date of Patent: Jun. 7, 2016

(54) METHOD FOR MECHANICALLY REMOVING PIN BONES FROM FILLET PARTS OF CONVEYED FISH AND DEVICE FOR PERFORMING SAID METHOD

(75) Inventor: Wolfhard Kowalski, Pütte (DE)

(73) Assignee: Nordischer Maaschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 14/386,339

(22) PCT Filed: Mar. 19, 2012

(86) PCT No.: PCT/EP2012/054817
§ 371 (c)(1),
(2), (4) Date: Sep. 18, 2014

(87) PCT Pub. No.: WO2013/139369
PCT Pub. Date: Sep. 26, 2013

(65) Prior Publication Data
US 2015/0044955 A1 Feb. 12, 2015
US 2015/0305354 A9 Oct. 29, 2015

(51) Int. Cl.
*A22C 25/00* (2006.01)
*A22C 25/16* (2006.01)
*A22C 25/18* (2006.01)

(52) U.S. Cl.
CPC ............... *A22C 25/166* (2013.01); *A22C 25/16* (2013.01); *A22C 25/18* (2013.01)

(58) Field of Classification Search
CPC ........ A22C 25/00; A22C 25/12; A22C 25/14; A22C 25/142; A22C 25/145; A22C 25/16; A22C 25/163; A22C 25/166
USPC .......................... 452/135, 149–156, 160–162
See application file for complete search history.

(56) References Cited

U.S. PATENT DOCUMENTS 3,902,222 A 9/1975 Hartmann
4,336,634 A * 6/1982 Braeger ................. A22C 25/16
452/135

(Continued)

FOREIGN PATENT DOCUMENTS

DE 3632520 A1 7/1987
DE 3632561 A1 7/1987
WO 2013139369 A1 9/2013

OTHER PUBLICATIONS

PCT/EP2012/054817 International Search Report and Written Opinion Date of Mailing: Dec. 12, 2012 Nordischer Maschinenbau Rud. Baader GmbH + Co. KG (11 pages).

*Primary Examiner* — Richard Price, Jr.
(74) *Attorney, Agent, or Firm* — Sunstone IP (57) ABSTRACT

In a method for mechanically removing intermuscular bones, so-called pin bones, from fillet parts of conveyed fish abdominal flaps for each fish are separated using a continuous, curved double separating cut. Each abdominal flap is simultaneously separated into two parallelly cut, completely free-moving parts having fish skin, which are conveyed away separate front one another. The first part is obtained as a narrow, curved pinbone strip, with a width corresponding to the row of pinbones and limited thereto. The second part is obtained as an abdominal flap meat body determined by the largest part of the separated abdominal flap, free of pin bones, with a cutting length having the curvature. An apparatus for performing the double separating cut of the abdominal flaps is formed by an abdominal flap cutting device which comprises two pairs of cutting tools which cut simultaneously for complete separation of the abdominal flaps, each said pair being designed to perform the double separating cut of the abdominal flaps. A guiding device has a guide which is height-adjustable in a height corresponding to the flank-side height of the fish. The guiding device holds the pairs of cutting tools, aligns them, and guides them to perform the curved double separating cut. The cutting tools of the pair of cutting tools are arranged with a distance which is adapted to the narrow width of the pinbone strip and corresponds to it.

22 Claims, 6 Drawing Sheets

(56) References Cited

U.S. PATENT DOCUMENTS

| | | | | |
|---|---|---|---|---|
| 5,554,069 A * | 9/1996 | Burch | .................. | A22C 25/145 452/149 |
| 5,830,052 A * | 11/1998 | Wadsworth | .......... | A22C 25/166 452/236 |
| 6,200,211 B1 * | 3/2001 | Braeger | .................. | A22C 25/16 452/161 |
| 6,604,991 B1 * | 8/2003 | Jurs | .......................... | B65D 5/00 452/150 |
| 7,090,574 B2 * | 8/2006 | Braeger | .................. | A22C 25/16 452/161 |
| 8,814,637 B2 * | 8/2014 | Jurs | ........................ | A22C 25/16 452/162 |
| 8,956,205 B2 * | 2/2015 | Kowalski | ............... | A22C 25/16 452/135 |
| 2004/0029512 A1 | 2/2004 | Jurs et al. | | |
| 2007/0293132 A1 | 12/2007 | Arnason | | |

\* cited by examiner

METHOD FOR MECHANICALLY REMOVING PIN BONES FROM FILLET PARTS OF CONVEYED FISH AND DEVICE FOR PERFORMING SAID METHOD

CROSS-REFERENCE TO RELATED APPLICATIONS

This application is a National Stage Application of PCT/EP2012/054817, filed Mar. 19, 2012, the subject matter of which is incorporated herein by reference in its entirety.

The invention concerns a method for mechanically removing intermuscular bones, so-called pinbones, from fillet parts of fish conveyed in the conveying direction, from which the head, including the collarbone, has been separated, which are at least essentially freed of entrails and which have fillet parts and abdominal flaps, which contain only a row of pinbones, wherein the pinbones are removed in that parts of the abdominal flaps which contain the pinbones are cut out with pinbone cuts. The invention also refers to an apparatus for mechanical processing of fish conveyed on a conveying path in a conveying direction, each said fish having the head, including the collarbone, separated and each at least essentially freed of entrails, comprising a conveying means conveying the fish along the conveying path and a pinbone/abdominal flap cutting device for separating parts of abdominal flaps and removing pinbones.

According to DE 2 317 622 B, a method is known for mechanically removing intermuscular bones, in which the beheaded fish is filleted by guided cuts on both sides of the belly spokes. A wedge-shaped piece of intermuscular bones, which contains the intermuscular bones, is cut out of each abdominal flap of the fish in the area of the abdominal cavity. Meat parts must be folded particularly for cutting. The throughput speed is low. Abdominal flaps, whose meat is of lower value, remain part of the fillet. The cutting of wedge shaped pieces of intermuscular bones is limited to fish which have only a relatively low number of pinbones.

A tool for intermuscular bones is known from DE 36 32 561; it has circular knives driven circumferentially around a shaft and a burin arranged between these circular knives. This known arrangement requires three cuts to remove intermuscular bones. Cuts are made parallel to the spinal column and thus exclusively linear in course, above and below the row of pinbones up to the spinal column. A third cut is necessary using the burin to separate a strip of meat containing the pinbones by scraping and lifting. The pinbone strips can twist, with the consequence that a loss of yield occurs and the processing speed is lowered. In this process with three cuts as well, the abdominal flaps remain part of the fillet pieces, which cannot be handled satisfactorily.

Another usual measure these days consists of separating the abdominal flap which contains the pinbones in a controlled manner corresponding to the fish size. Such separated abdominal flaps, which are relatively large pieces and contain pinbones, remain unsatisfactory for further economic processing. They must be skinned, transported and fed to separators for separation. A relatively large quantity of separated, low value meat arises, from which fish forcemeat in particular is produced. The abdominal flaps containing pinbones are not available for so-called "block yield", which is determined by combining pieces of meat free of pinbones in blocks in transport frames, boxes or the like.

It is the object of the invention to improve the separation of abdominal flaps containing pinbones with respect to greater yield of grown meat and simplified, faster subsequent processing operations. In particular, the mass of meat to be separated in separators is to be significantly reduced, and separated abdominal flaps free of pinbones should contribute to the increase of block yield. Abdominal flaps free of fish bones should arise, which after skinning can be combined for the most part in a relatively large volume block, which, for example is formed in a mold and subsequently frozen. The quantity of abdominal flap parts bearing pinbones, whose meat must be separated from fish bones in separators, ought to be reduced to a great extent.

In conjunction with the method steps mentioned hereinbefore, the objects are achieved according to the invention in that each abdominal flap is separated by means of a continuous, curved double separating cut with which two parallel separating cuts are performed simultaneously, in which the abdominal flap is separated simultaneously into two parallel cut, completely free-moving parts having fish skin, which are conveyed away separate from one another, wherein the first part is obtained as a narrow pinbone strip, which is curved in its length dimension with a length, i.e. over it, which is determined by the cutting length of the continuous double separating cut and has a narrow width which corresponds to the width of the row of pinbones and is limited thereto, and wherein the second part is obtained as an abdominal flap meat body determined by the largest part of the separated abdominal flap, free of pinbones, with a cutting length having the curvature and corresponding to the cutting length of the pinbone strip.

In conjunction with the features mentioned hereinbefore, the objects are achieved by an apparatus where for completely separating the abdominal flaps, the pinbone/abdominal flap cutting device comprises two pairs of simultaneously cutting cutting tools, which each are arranged and configured for performing an associated double separating cut of the abdominal flaps producing two curved, parallel separating cuts according to the method according to any one of the method claims, so that simultaneously the narrow pinbone strip and the abdominal flap meat body free of pinbones are obtained, wherein a guiding device with a guide, which is height-adjustable in a height corresponding to the flank-side height of the fish, is configured in such a way that it holds, orients and guides the pairs of cutting tools for performing the curved double separating cut on fish passing in a conveying direction, and wherein the two cutting tools of the pairs of cutting tools each are arranged with a distance which is adapted to the narrow width of the pinbone strip and corresponds thereto. The guide is formed by a guiding means.

A number of advantages is achieved with the measures according to the invention. In particular, one can successfully obtain fish fillets which are free of abdominal flaps with relatively high throughput speed, in such a way that each abdominal flap when completely separated by only one cutting process is simultaneously cut into a piece free of fish bones which constitutes the greatest part of the abdominal flap and a small, strip-shaped piece containing the pinbones, a so-called "pinbone strip", which is small in mass compared to the first piece. This is achieved with the continuous and curved double separating cut over the abdominal flap according to the invention, which is determined by separating cuts parallel over the entire cutting length. The double separating cut of the abdominal flaps is performed on fish which have had the backbone removed. The fillet parts are still connected with a strip having the dorsal fins. Abdominal flaps are understood to be the parts of fish which are or are to be separated, which as such have at least partially formed the abdominal cavity. The length and/or size of such an abdominal flap is determined by the length of the pinbone zone and the curved cut to be made after the pinbone zone.

The pinbones are included in the curved cut strip if the fish to be processed is still in its essentially natural position or form, respectively, thus before the fillet pieces are completely separated. The two unequal, simultaneously cut and separated parts are parts having fish skin. The lower large-mass part of each abdominal flap, which is free of pinbones, can be recovered with relatively high speed in most cases. Pieces of abdominal flap meat without fish bones are obtained, which can be processed further profitably, particularly by increasing the block yield. Likewise, the narrow, curved pinbone strips allow optimal for further processing, with the mass of meat to be separated reduced for the benefit of recovering grown meat.

The double separating cut according to the invention captures the row of continuous (single-row) pinbones targeted with respect to place and time, wherein the optimal application of the cut and guidance is such that the double separating cut is curved at least outside the row of pinbones and runs transverse to the length of the fish. For example, the method according to the invention can be applied for filleting whitefish, for example Alaska pollock, having a relatively short row of pinbones. However, it has proven particularly advantageous for the removal of pinbones from salmonids, particularly from pink salmon. This fish contains a considerable number of pinbones in a row, which are captured completely in the curved strips produced by the double separating cut, with abdominal flap meat bodies free of pinbones with a size particularly good for processing and particular suitability for further processing being obtained.

The removal of the pinbone strips from the conveying path of the fish trunks, i.e. from the main conveying path, can be supported particularly in that the pinbone strips are moved on a discharge path for removal, wherein, at least for entry onto the discharge path, they are advantageously moved along a track limited on four sides with guiding facilities.

The narrow pinbone strips can advantageously be cut with a width which is at most a quarter of the dimension of the uncut abdominal flap to be separated in a corresponding dimension.

It is practical for the curved double separating cuts to be performed, depending on the fish size, between two cutting points depending on the fish size, namely at an associated flank side of the fish between a cutting point on the head side and a cutting point on the abdominal side.

The method according to the invention can be applied equally with head-first and tail-first conveyance. For example, the fish are conveyed head-first with belly downwards in a conveying direction. For such an application, the curved double separating cut begins at a higher position on the head side of the fish and is guided downward on a curved path in the direction of the anus.

In a particularly advantageous embodiment, the double separating cut according to the invention can produce optimally small pinbone strips dependent on the fish size for each individual fish. Using per se known, preferably computerised fish control, control movements are produced, particularly as a consequence of control signals, which represent the fish size of each fish arriving for processing, and the parallel separating cuts of the double separating cuts are performed with parallel distances which are automatically changed dependent on the control in each case to adapt to the size of the fish arriving for processing. Fish size data can be obtained in the usual way with the help of measurements on the fish to be processed. Measurement data obtained by sensors in particular can be processed by computer control in conjunction with control elements or actuators.

It is practical to perform cuts which mostly free the fish meat from fish bones prior to the start of the curved double separating cut. Prior to the start of the curved double separating cut, the backbone can be separated by cutting it free over the entire length of the fish up to the dorsal fin roots, wherein the back side of the fish remains connected with back meat and bears the fillet parts with abdominal flaps.

The cutting tools of the apparatus can be designed and arranged in any way to suit the purpose if they are configured such that they can execute the curved double separating cut according to the invention. For example, cutting can be performed with water jets or jig saws. A particular design consists of the two cutting tools of the pair of cutting tools being constituted by a pair of circular knives which are arranged parallel at a distance on a common drive rotary axis for cutting the narrow width of the pinbone strip. A particular benefit is obtained if the two circular knives of the pair of cutting tools have the same circular diameter. They are then completely the same.

Between said two circular knives in a pair of cutting tools, it is advantageous to provide a discharge path which guides the pinbone strips and leads away obliquely from the conveying path, said discharge path being advantageously formed by at least two deflector walls extending in the direction of discharge or by suchlike deflecting elements.

One embodiment of the discharge path consists of an inner deflector wall formed between the two circular knives, namely situated towards their drive rotary axis, from the middle area up to the peripheral area of the two circular knives between therebetween. The inner deflector wall can be constructed with such a length that it passes the drive rotary axis. Between the two circular knives an outer deflector wall, i.e. lying towards the edges of the two circular knives, can be designed, which guides the pinbone strip on the discharge path at least to the beginning of the cut.

A meat body deflector wall guiding the abdominal flap meat body away or a similar deflector element can be advantageously arranged and provided with an extension which together with the inner deflector wall forms a pinbone strip discharge path.

A particularly simple embodiment is obtained as well if a pinbone strip deflector wall and the meat body deflector wall form a cutting counter-surface for completely cutting off the pinbone strip and the abdominal flap meat body. A preferred embodiment consists of the cutting counter-surface being equipped with a knife slot which separates the outer pinbone strip deflector wall and the meat body deflector wall from one another and in which a circular knife facing the belly side of the fish trunk engages with its cutting edge.

A preferred embodiment which optimally produces the curved double separating cuts consists of the height-adjustable guide of the guiding device being designed in such a way that it automatically adjusts the height of the pairs of cutting tools as a function of the fish size, in particular in conjunction with a fish size measurement, to cut the continuous curved pinbone strips over the extent of the abdominal flap. The guiding device is controlled dependent on fish size data in such a way that the movement of the pairs of cutting tools in combination with the fish movement brings about the curved cutting line. The height adjustment comprises the setting of a height/initial position, with which the double separating cut begins, to the position of the pinbones individually for each fish.

A further advantageous embodiment is obtained where the cutting tools of the pair of cutting tools are connected with an adjusting device with which the distance of the cutting tools can be changed. Preferably, this adjusting device is designed as an automatic adjusting device with which the distance of the cutting tools can be set and adjusted automatically dependent on control movements and/or signals which represent the size of fish to be processed.

Advantageously, at least one fish bone cutting device for cutting free and separating the backbone is arranged upstream of the pinbone/abdominal flap cutting device, wherein the back side of the fish remains connected to back meat and bears fillet parts with the abdominal flaps containing the pinbones.

Dependent claims are based on the embodiments of the invention described and on other expedient and advantageous embodiments. Only particularly expedient and advantageous forms and options of design are described in more detail based on the following description of the exemplary embodiments represented in the schematic drawing. Each individual or detailed design in an exemplary embodiment is to be understood as an independent detailed example for other implementations and designs in the scope of the invention which are not described or not described completely.

Figure 1:
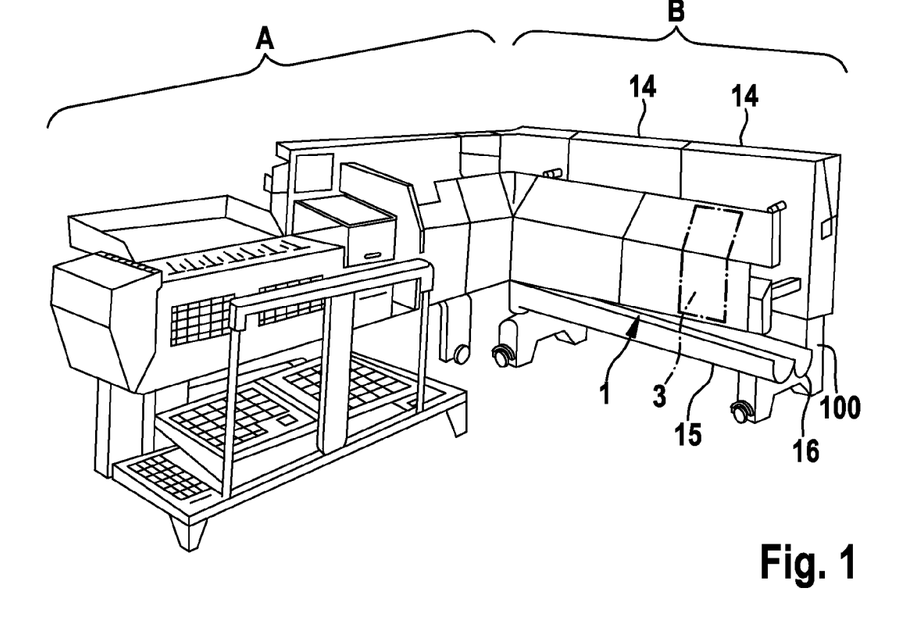
FIG. 1 an axonometric view of a fish processing machine with a section A for beheading and gutting and a section B for filleting fish, and there the location for arranging an apparatus according to the invention.
Figure 2:
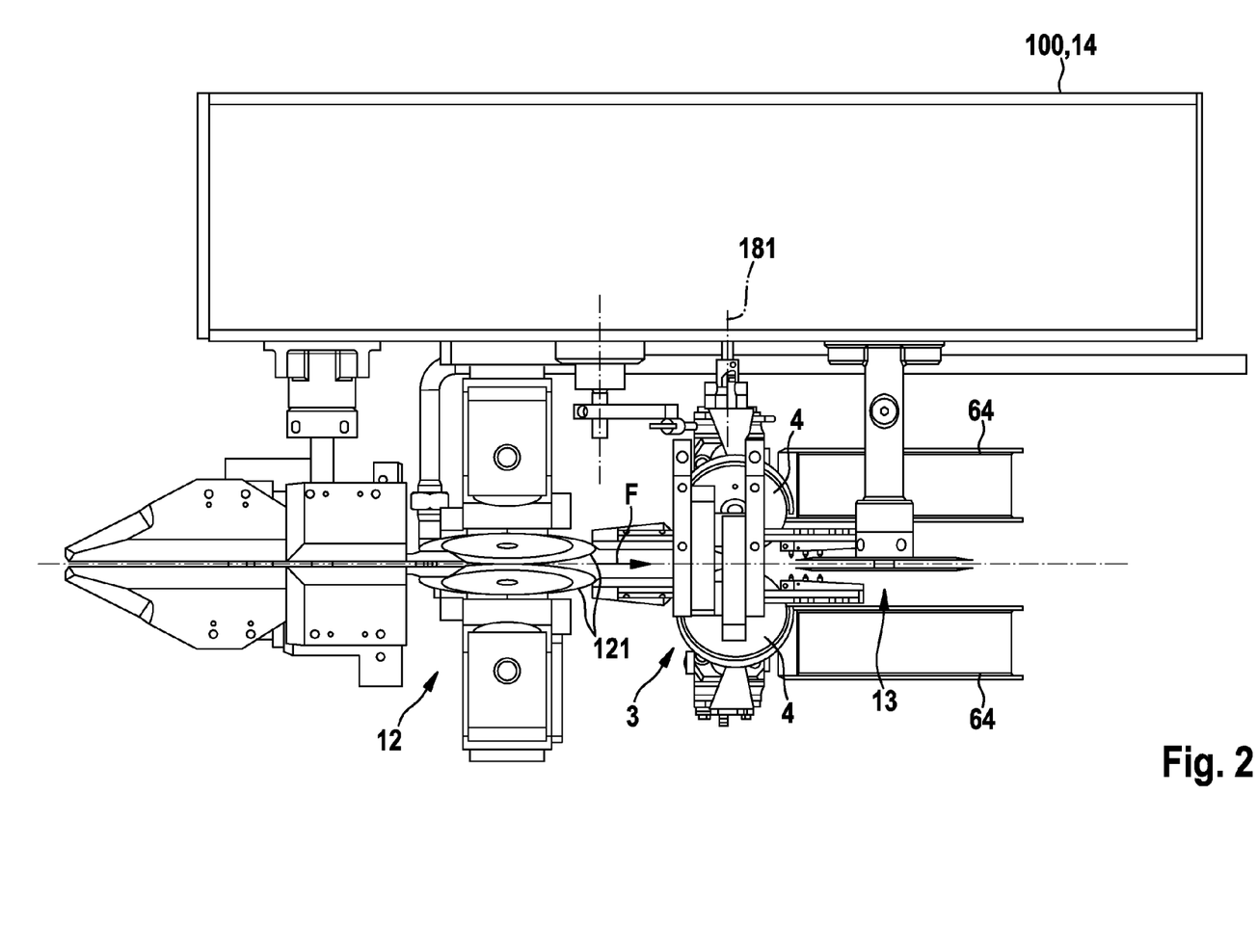
FIG. 2 a top view in section B of FIG. 1, of a backbone cutting device, of a pinbone/abdominal flap cutting device according to the invention and of a separating cut cutting device.

The invention will be explained in conjunction with a process line, as is per se known, based on FIGS. 1 and 2. A beheading, gutting and filleting machine is shown, which is designed in particular for processing salmonids. The machine has a section A in which fish to be processed, in particular pink salmon, are placed next to each other in troughs, beheaded and gutted. The fish are transferred to a section B for filleting, where, one after another in a row, in the exemplary embodiment head-first and belly downwards, they receive a series of cuts.

Section B comprises an apparatus 1 for mechanical fish processing, which is equipped with the pinbone/abdominal flap cutting device 3 according to the invention. Devices 14, such as machine housings, control and drive assemblies or suchlike, are arranged on a base or frame 100 on the processing path. A discharge chute 15 for removing cutting waste and a discharge chute 16 are provided below the conveying line, the latter receiving cut abdominal flap meat bodies 942 according to the invention (FIGS. 6 and 7) and guiding them away.

As is generally known, in section B the abdominal cavity of the fish is first opened from below with an abdominal cut, wherein lower ray bones are cut free up to the backbone from the end of the abdominal cavity to the root of the tail. Then a flank cut is performed to separate the fish meat on the abdominal flaps from flank bones, during which the flank bones still remain connected to the backbone as a skeleton. Then a flank bone cut takes place, which separates the flank bones from the backbone. Then a backbone cut is performed with a backbone cutting device 12. Two backbone circular knives 121 cut the backbone free from below up to the dorsal fin roots over the entire length of the fish so that it is separated. Toward the back side of the fish 9, its fillet parts 96 remain connected with the abdominal flaps 94 via the back meat 91. The backbone cut is followed by the abdominal flap and pinbone cut according to the invention, which is performed with the pinbone/abdominal flap cutting device 3 according to the invention.

A separating cut takes place at the end of the filleting process. From above, two circular knives cut a strip with the dorsal fins from the fish 9. Two fish fillets 96 are produced. In the exemplary embodiment, the separating cut cutting device 13 is envisaged. The fish fillets 96 are guided away, for example via belts or chutes, which are not shown.

Figure 3:
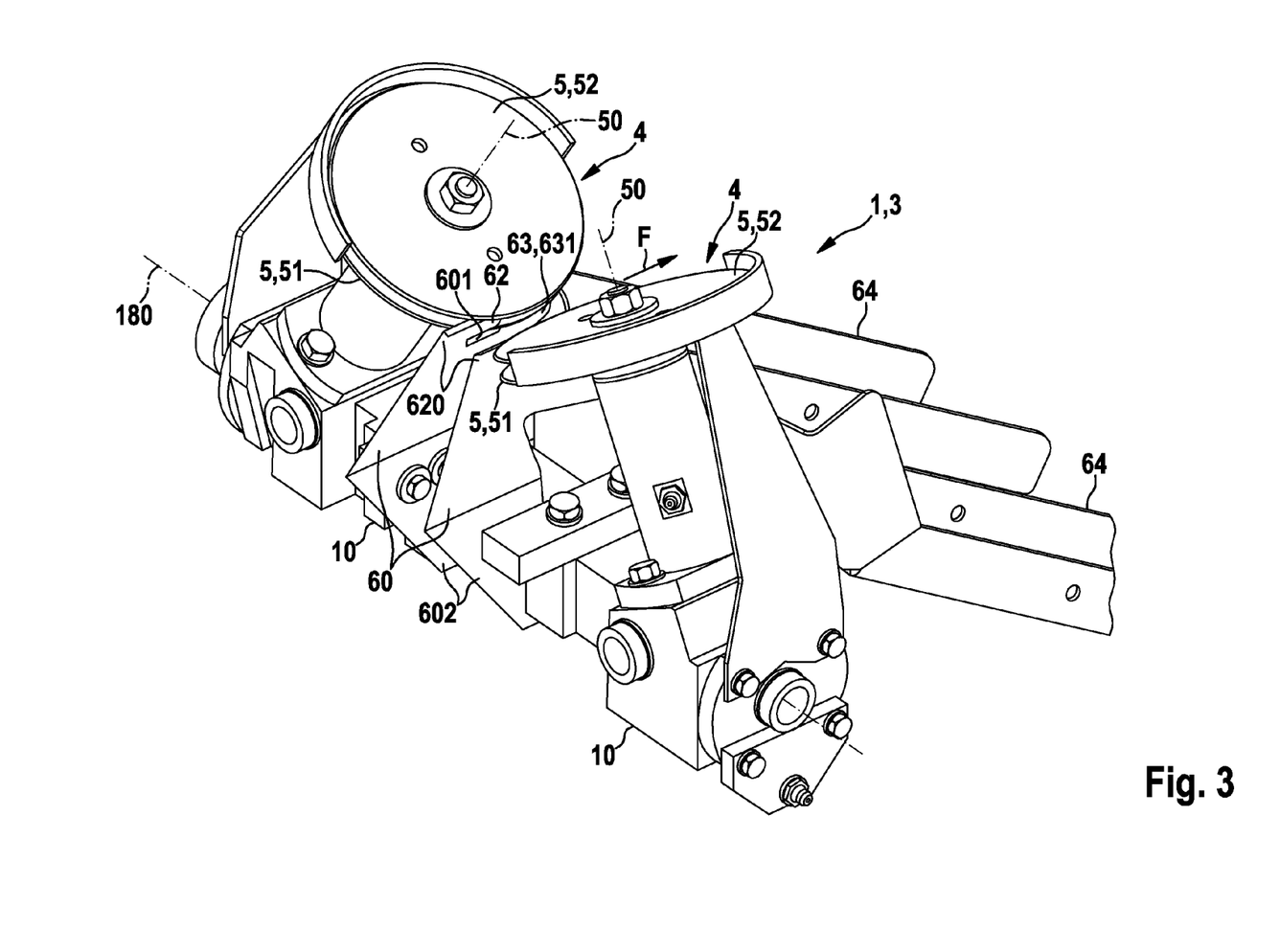
FIG. 3 to 5 an axonometric representation of a back-side oblique view, a rear view and a top view of an apparatus according to the invention which is formed by a pinbone/abdominal flap cutting device.
Figure 4:
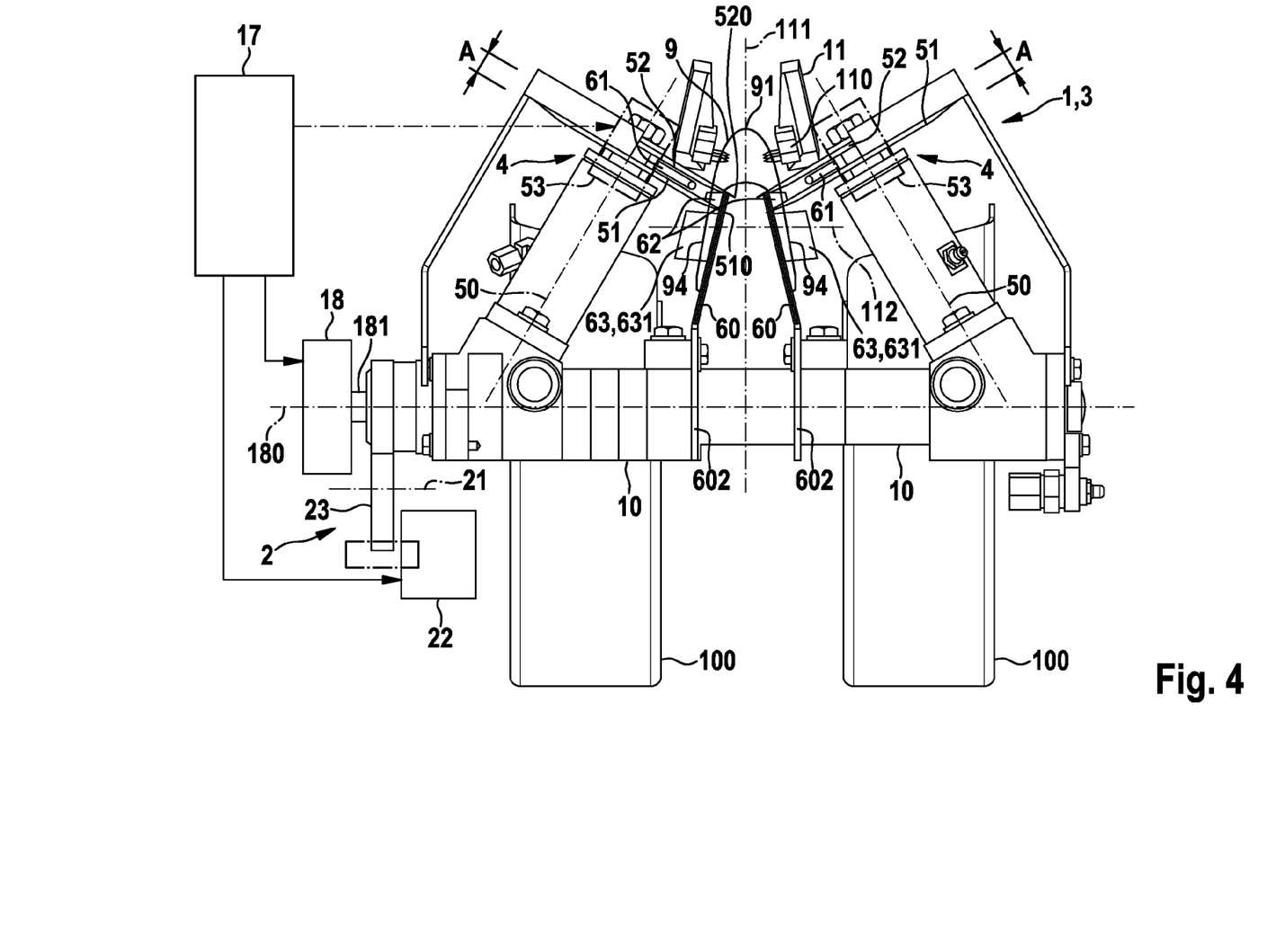
Figure 5:
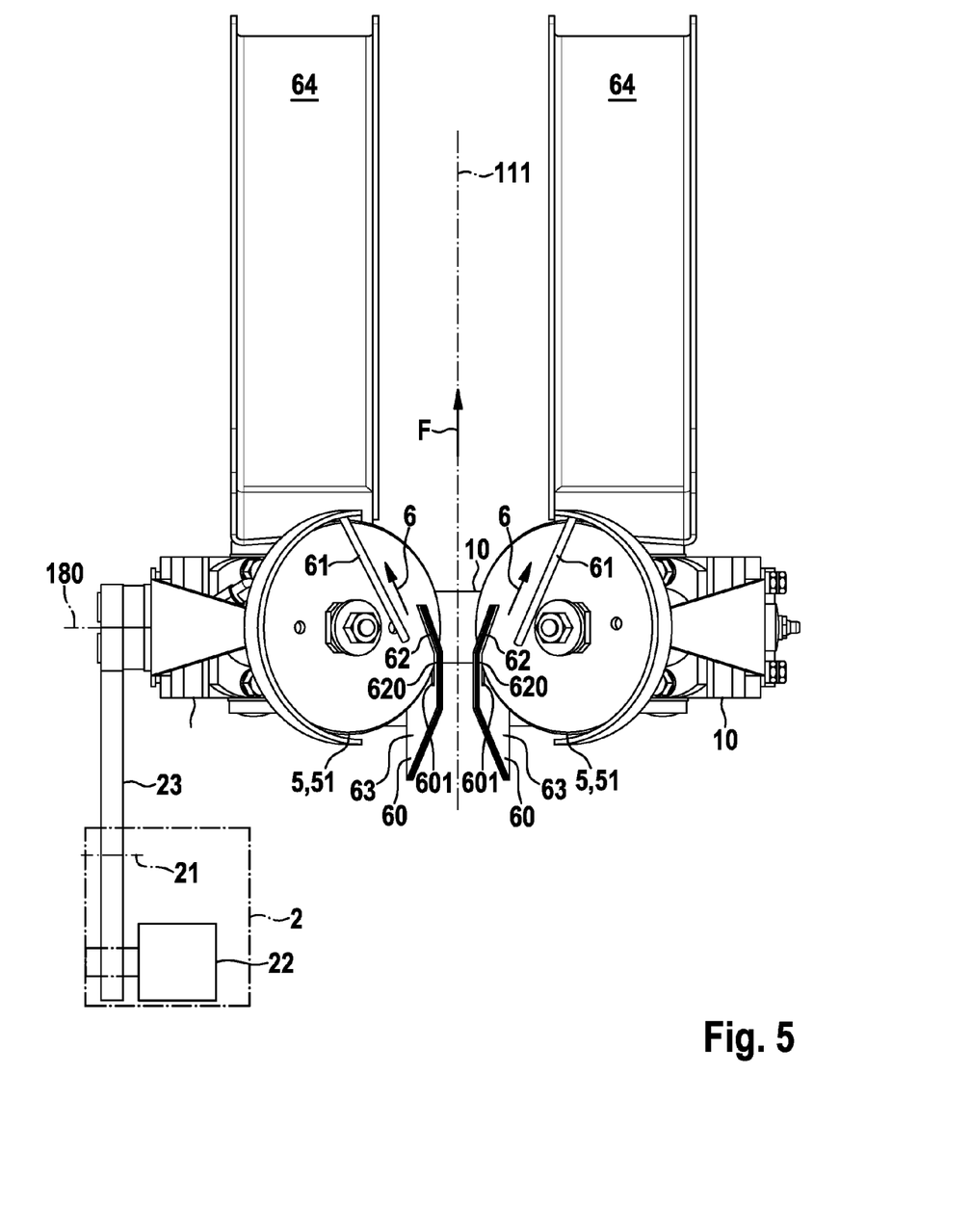

Assemblies of the pinbone/abdominal flap cutting device 3 according to the invention are shown in the example based on the FIGS. 3 to 5. Two pairs 4 of simultaneously cutting cutting tools 5 are a significant part of the pinbone/abdominal flap cutting device, which pairs are arranged with a distance A in each pair. A guiding device 2 with height-adjustable guidance, shown in FIGS. 4 and 5, controls and guides the pairs of cutting tools 4. These have a V-shaped arrangement symmetrical to a vertical conveying plane 111, which can be moved to a desired height and is movable to perform the abdominal flap/pinbone cuts. The V-arrangement is such that the pairs of circular knives limit a V-shaped space which narrows downward to a restricting gap. The circular knives 51, 52 each lie opposite with cutting edges 510, 520 forming knife edges in the area of the restricting gap at the same height and/or a corresponding height in the vertical conveying plane 111. Beheaded, gutted fish with the backbone removed, as seen in particular in FIG. 4, pass the restricting gap in the conveying direction.

Each pair of cutting tools 4 is constituted by a pair of identical circular knives, namely a lower circular knife 51 and an upper circular knife 52, which are arranged in parallel with the distance A on a common drive rotary axis 50 which drives them at the same circumferential speed. The two drive axes 50 are driven around on a common main shaft 181 of a drive 18, which is supported in a console 10 and rotatable on an axis 180, with gears which are not shown.

A special pair of cutting counter-surfaces 60 is associated with the restricting gap. The two cutting counter-surfaces 60 have plate-like guiding parts which are roof-shaped in orientation and, guiding the fish 9 to be cut in the conveying direction F, are defined by contact areas and guiding surfaces which are symmetrical with respect to the vertical guiding plane 111 and form between them a trapezoidal space narrowing towards the top, said space lying partially under the pairs of cutting tools 4 and extending vertically into the restricting gap between the knife edges of the pairs of cutting tools 4 which face each other. Each cutting counter-surface 60 is attached to the console 10 with an angled foot section 602.

The pinbone/abdominal flap cutting device 3 has two alike sides or halves, which form units, and which are arranged opposite to each other on the conveying path respectively on the conveying plane 111. Each device unit comprises in a spatially fixed arrangement with respect to each other the pair of cutting tools 4, the cutting counter-surface 60, a discharge path in the form of a slide 64 and the console 10 supporting the units. This is connected to a pivot arm 23 in a manner secured against rotation, so that it is pivotally supported by means of the pivot arm 23 around a pivot axis 21 of the guiding device 2 to set the aforementioned pivot-height setting and pivot guide of the pairs of cutting tools in the height corresponding to the flank side height of the fish. The free end of the pivot arm 23 is connected with an actuator or a controlling element, for example with a servo motor or step motor, to form the height guidance, namely the guiding means of the guiding device 2, in conjunction with the mounting and/or pivot linkage of the units. The pivot axis 21, viewed in the conveying direction F, is provided, for example, before the pairs of cutting tools 4 using a pivot bearing on the machine base frame or frame 100 of the pinbone/abdominal flap cutting device 3. The console 10 is also supported on this frame base or frame. The pivot axis 21 extends crossways, in the exemplary embodiment perpendicular to the conveying direction F. It is located below a horizontal conveying plane 112 for the fish 9 at a distance such that each pair of cutting tools 4 in the area of the restricting gap is able to pivot into the desired height or initial position there and, starting from this position, is able to pivot such that a particular cutting line is performed which is described further below. Any guiding device which executes a controlled height setting and movement can be provided.

The vertical conveying plane 111 and the horizontal conveying plane 112 perpendicular thereto which extend in the conveying direction F are determined by a conveying means 11 with which the fish 9 are conveyed through between the cutting device units and/or the pairs of cutting tools 4. The conveying means 11 is formed, for example, by a spike conveying chain device shown in FIG. 4. In such a conveying device, the fish 9 are held and conveyed in the conveying direction F between revolving spike conveying chains 110 head-first and belly downward. The spike conveying chains 110 run over chain guide rollers. Any other conveying means for fish conveyance in a filleting line can be provided.

The cutting counter-surface 60 of each cutting device unit comprises, in the conveying direction F, a front part parallel to the conveying direction F and a back part bending outward away from the processing line at an obtuse angle. The back part forms a pinbone strip deflector wall 62 with an upper part facing the back side of the fish, said part reaching between the circular knives 51, 52, and forms a deflector wall 63 with a lower part 631, which is located under the pair of circular knives 51, 52. The deflector wall 62 and the deflector wall 63 are separated by a knife slot 601, which ends open at the free and in the conveying direction F back edge of the cutting counter-surface 60. The front contact part, in which the knife slot 601 begins, is formed by the roof-shaped surface which extends under the pair of cutting tools 4. In the exemplary embodiment, the deflector wall 62 is only a little smaller than a fixed or minimal distance A between the two circular knives 51, 52 of the pair of cutting tools 4, so that it remains free from the interior surfaces of the circular knives 51, 52 which face each other. The deflector wall 62 is the extension of an upper contact surface 620 of the front contact part. As can be seen in particular in FIG. 5, the lower circular knife 51 extends through the knife slot 601 in the free end area of the same transverse to the conveying direction F. In this manner, the cutting tool 5 with its parallel circular knives 551, 52 of the same diameter forms the pair of cutting tools 4 which performs the double separating cut.

The deflector wall 62 extends as an outer deflector wall with a secant section in a secant line of the circular knives 51, 52. The upper circular knives 52 have been removed in the representation in FIG. 5. It is particularly well apparent that the secant section of the outer deflector wall 62 overlaps with an inner deflector wall 61 also being arranged in a secant section, the secant line of which is offset with respect to the centre of rotation of the circular knives 51, 52 and which extends to the edges of the circular knives 51, 52 protruding a little past them. A discharge path 6, which leads away obliquely from the conveying path or the process line, is thus formed in the space between the two circular knives 51, 52. The inner deflector wall 61, situated towards the drive rotary axis 50 of the circular knives 51, 52, is located in a position in which it passes the drive rotary axis 50 and extends from the middle area up to the peripheral area of the two circular knives 51, 52. A four-walled guiding section similar to a channel forms in the area of overlap of the two deflector walls 61, 62.

The discharge path 6 ends in a slide 64 which is added with an inlet side tangential to the pair of cutting tools 4, i.e. in an oblique position to effect a sliding motion with the force of gravity. The slide 64 is aligned parallel to the conveying direction F in the exemplary embodiment. Any other orientation in which the discharge paths 6 lead to the chutes 64 is possible.

The cutting tools 5 of the pair of cutting tools 4 are connected with an adjusting device 53 shown with a dash-dot line, with which the distance A of the two circular knives 51, 52 can be changed.

The parts and assemblies described for the device units are set and designed in such a way and are operated such that, as shown in FIGS. 6 and 7, on each flank side of the gutted, beheaded fish 9 passing through between the two device units in the conveying direction F, the abdominal flap meat body 942 essentially determined by the size of the fish abdominal flap and a pinbone strip 941 containing pinbones 95 are cut, with the pairs of cutting tools 4 each executing a curved double separating cut over the abdominal flaps 94 with which two parallel separating cuts take place simultaneously in such a way that the abdominal flap meat body 942 and the pinbone strip 941, come completely free at the same time after completion of the double separating cut. The abdominal flap meat bodies 942 are guided away via the parts 631 of the deflector walls 63 so that they reach the discharge chute 16 below, shown only in FIG. 1. Separately, the pinbone strips 941 are guided along the deflector walls 61, 62 into the slides 64.

The functions and the method according to the invention are performed in detail as follows. Fish 9 with the head, including the collarbone and backbone, separated and at least essentially freed of entrails are conveyed in a row one after another in fish conveying direction F into the pinbone/abdominal flap cutting device 3. These fed products are produced in the filleting line B with an abdominal cut, a flank cut, a rib bone cut and a backbone cut as described above. They then have only fillet parts 96 and the abdominal flap 94, the latter containing a row of pinbones 95 with a row width R.

Parts of the abdominal flaps 94 which contain the pinbones 95, i.e. the pinbone strips 941, are cut out of the fish 9, with each pair of cutting tools 4 performing the curved double separating cut pass over the abdominal flaps 94, which is determined as such by two simultaneous, parallel separating cuts and separates the abdominal flap 94 passing it.

Figure 6A:
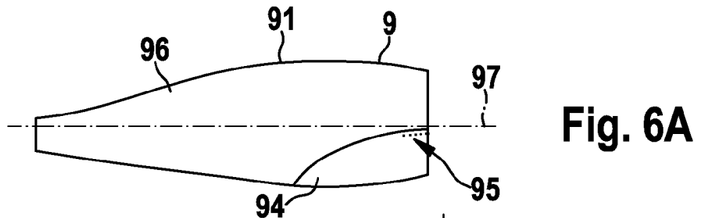
FIG. 6A to 6D and FIG. 7A to 7D fish parts which are cut during the passage of a fish to be processed through the pinbone/abdominal flap cutting device.
Figure 6B:
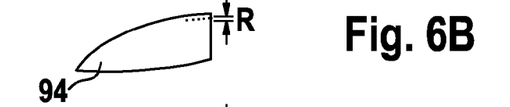
Figure 6C:
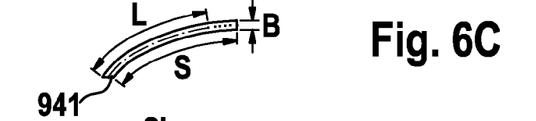
Figure 6D:
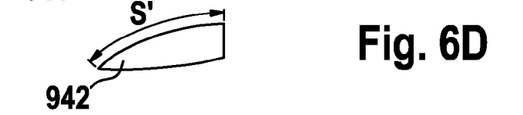
Figure 7A:
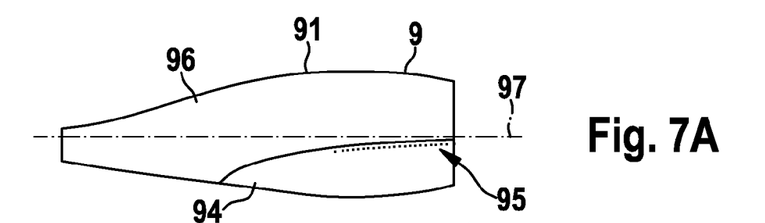
Figure 7B:
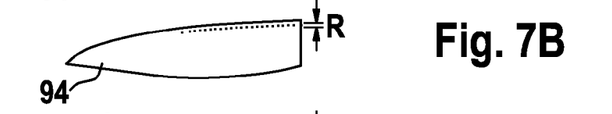
Figure 7C:
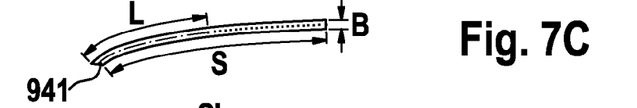
Figure 7D:
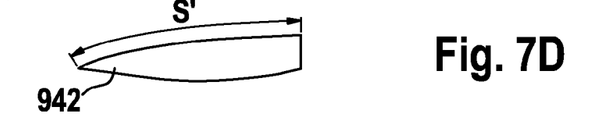

The course of the continuous curved double separating cut is shown in FIGS. 6A to 6D with the exemplary embodiment for Alaska pollock. As is clear from FIG. 6A, the double separating cut runs from the head side of the fish 9 beginning outward or below toward the belly side. If one considers a line which lies somewhat in the swimming line of the fish 9 as a central fish axis 97, then it is important that the pair of cutting tools 4 on each flank side of the fish 9 conveyed in a swimming position begins the double separating cut on the head side on or near the fish axis 97 to ensure that the abdominal flap 94 is included completely with pinbone strips 941 and abdominal flap meat bodies 942. The double separating cut is then carried out in such a way that the narrow strip 941 containing the pinbones 95 is cut curved in its longitudinal dimension first along the row of pinbones and then in the height corresponding to the flank-side height of the fish with a curvature length L which is determined by the cutting length S of the continuous double separating cut. Along the row of pinbones, the cutting line can be at least essentially straight, but begin already appropriately with curvature, if necessary at first with a small measure of curvature. The pinbone strip 941 has a narrow width B which corresponds to the width R of the row of pinbones 95 and is limited thereto. At the same time, the abdominal flap meat body 942, which is determined by the largest part of the abdominal flap 94 and free of pinbones, is obtained with a cutting length S', which corresponds to the cutting length S containing the curvature for the pinbone strip 941. The cutting length S and the curvature length L in FIG. 6C are measured and/or viewed along a dash-dotted centre line of the pinbone strip 941. The cutting length S' of the abdominal flap meat body 942 is viewed as a length of its cut edge.

To obtain an optimal pinbone strip 941 with width B all the time, the automatic height control of the pairs of cutting tools 4 takes place by means of the guiding device 2 with a height-adjustable guide such that it is ensured that the pair of cutting tools 4 includes in each case the row of pinbones dependent on their position individually for each fish 9. A per se known fish size control device 17 is provided for this purpose; it processes the measured or recorded values or data representing the size of each fish in a suitable way. Such a device advantageously comprises a computing device to which signals, obtained for example by fish size measurement with sensors, are fed and which, with suitable path monitoring of the measured fish 9, controls the pairs of cutting tools 4 in each case with an adjusting device controlled by the device 17, in the exemplary embodiment by means of the actuator 22, adjusting height and its movement for cutting and thus controlling the cutting line. The fish size control device 17 is shown only in FIG. 4. The row of pinbones can also be recorded in each case with respect to size, shape and/or dimensions. Corresponding data are used for computerised control.

A special measure is also that in each case the distance A of the cutting tools 5 of the pair of cutting tools 4, i.e. the width B of the double separating cut, is controlled according to the measure of individual pinbone arrangement/structure, fish size and/or fish type. For this purpose, the pinbone/abdominal flap cutting device 3 comprises the adjusting devices 53 shown dash-dotted in the drawing, which adjust the distance between the circular knives 51, 52, for example by spacer elements between the circular knives 51, 52 which can be changed in length axially. Also for this purpose the aforementioned data and/or dimensions are obtained from each fish 9, with which the fish size control device 17 controls the optionally provided adjusting devices 53.

The curved cut is adapted to the position and length of the row of pinbones by moving in (height setting) and deflecting (cutting line) the pairs of cutting tools 4 with the guiding device 2 by means of the control device 17. Whereas with one type of fish, for example Alaska pollock, the row of pinbones is determined by only a few, in particular four pinbones (FIG. 6A to 6D), the number of pinbones in other fish, for example salmonids, is considerably greater, as shown in FIG. 7A to 7D. The line of curvature is controlled in this respect dependent on the type of fish with measured and/or pre-specified stored fish data for operating the control device 17. Individual separate control modules can be provided instead of the control device 17.

The invention claimed is:

1. A method for mechanically removing intermuscular bones, or pinbones, from fillet parts of fish conveyed in conveying direction, from which the head, including the clavicle, has been separated, which are at least essentially freed of entrails and which have fillet parts and abdominal flaps, which contain only a row of pinbones, wherein the pinbones are removed in that parts of the abdominal flaps which contain the pinbones are cut out with pinbone cuts, characterised in that each abdominal flap is separated by a continuous, curved double separating cut with which two parallel separating cuts are performed simultaneously, wherein the abdominal flap is separated simultaneously into two parallelly cut, completely free-moving parts having fish skin, which are conveyed away separate from one another, wherein a first part is obtained as a narrow, curved pinbone strip, which is curved in its length dimension with a length, which is determined by the cutting length of the continuous double separating cut and has a narrow width which corresponds to the width of the row of pinbones and is limited thereto, and wherein a second part is obtained as an abdominal flap meat body determined by a largest part of the separated abdominal flap, free of pinbones, with a cutting length having a curvature and corresponding to the cutting length of the pinbone strip.

2. The method according to claim 1, characterised in that pinbone strips are moved on a discharge path for removal, wherein, at least for entry onto the discharge path, they are moved along a track limited on four sides with guiding facilities.

3. The method according to claim 1, characterized in that pinbone strips are each cut with a narrow width which is at most a quarter of the dimension of an uncut abdominal flap in a corresponding dimension.

4. The method according to claim 1, characterised in that, depending on the fish size, the curved double separating cuts are performed between two cutting points, namely at a associated flank side of the fish between a cutting point on the head side and a cutting point on the head side and a cutting point on the abdominal side.

5. The method according to claim 1, characterised in that the fish are conveyed head-first with belly downwards in conveying direction.

6. The method according to claim 1, characterised in that control signals are generated which represent the fish size of each fish arriving for processing, and that the parallel separating cuts of the double separating cuts are performed with parallel distances which are automatically changed dependent on the control signals in each case to adapt to the size of the fish arriving for processing.

7. The method according to claim 1, characterised in that prior to the start of the curved double separating cut, cuts are carried out which mostly free the fillet meat of the fish from fish bones.

8. The method according to claim 1, characterised in that prior to the start of the curved double separating cut, the backbone is separated by cutting the backbone free over the entire length of the fish up to the dorsal fin roots, wherein the back side of the fish remains connected with back meat and bears the fillet parts (96) with abdominal flaps.

9. An apparatus for mechanical processing of fish conveyed on a conveying path in conveying direction, each said fish having the head, and the collarbone separated and each fish at least essentially freed of entrails, comprising a conveying means conveying the fish along the conveying path and a pinbone/abdominal flap cutting device for separating parts of abdominal flaps and removing pinbones, characterised in that for completely separating the abdominal flaps, the pinbone/abdominal flap cutting device comprises two pairs of simultaneously cutting tools, which each are arranged and configured for performing an associated double separating cut of the abdominal flaps producing two curved, parallel separating cuts according to the method according to claim 1, so that simultaneously a narrow pinbone strip and an abdominal flap meat body free of pinbones are obtained, wherein a guiding device with a guide, which is height-adjustable in a height corresponding to a flank-side height of the fish, is configured in such a way that it holds, orients and guides the pairs of cutting tools for performing the curved double separating cut on fish passing in conveying direction, and wherein the two cutting tools of the pairs of cutting tools each are arranged with a distance which is adapted to a narrow width of a pinbone strip and corresponds thereto.

10. The apparatus according to claim 9, characterised in that the two cutting tools of the pair of cutting tools are formed by a pair of circular knives which are arranged parallel at distance on a common drive rotary axis for cutting a narrow width of the pinbone strip.

11. The apparatus according to claim 10, characterised in that the two circular knives of the pair of cutting tools have equal circular diameters.

12. The apparatus according to claim 10, characterised in that between the two circular knives of a pair of cutting tools, a discharge path is provided which guides the pinbone strips and leads away obliquely from the conveying path, said discharge path being formed by at least two deflector walls extending in the direction of discharge.

13. The apparatus according to claim 12, characterised in that an inner deflector wall situated between the two circular knives, namely situated towards a drive rotation axis, is formed from a middle area up to a peripheral area of the two circular knives therebetween.

14. The apparatus according to claim 13, characterised in that the inner deflector wall passes the drive rotary axis.

15. The apparatus according to claim 10, characterised in that between the two circular knives a deflector wall is arranged which is situated towards the edges of the two circular knives, which deflector wall guides a pinbone strip on the discharge path at least to the beginning of the cut.

16. The apparatus according to claim 15, characterised in that correspondingly configured with the two circular knives of a pair of cutting tools is a cutting counter-surface, which is formed with a deflector wall (62) conveying away a pinbone strip and with a corresponding deflector wall conveying away the abdominal flap meat body.

17. The apparatus according to claim 16, characterised in that the cutting counter-surface is equipped with a knife slot which separates the pinbone strip deflector wall and the meat body deflector wall from one another and in which the circular knife facing the belly side of the fish engages with its cutting edge.

18. The apparatus according to claim 9 characterised in that the height-adjustable guide of the guiding device is designed in such a way that the height adjustable guide automatically adjusts the height of the pairs of cutting tools dependent on the fish size to cut the curved pinbone strips which continue over an extent of the abdominal flap.

19. The apparatus according to claim 9, characterised in that the cutting tools of the pair of cutting tools are connected with an adjusting device with which the distance of the cutting tools can be changed.

20. The apparatus according to claim 19, characterised in that the adjusting device of the pair of cutting tools is an automatic adjusting device with which the distance of the cutting tools is automatically adjustable and can be set dependent on control signals which represent the size of fish to be processed.

21. The apparatus according to claim 9, characterised in that a fishbone cutting device for separating the backbone is situated before a pinbone/abdominal flap cutting device in such a way that the back side of the fish remains connected still to back meat and bears fillet parts with the abdominal flaps.

22. The apparatus according to claim 9, characterized in that the conveying means is designed for conveying the fish in an orientation with their bellies downward and head-first.

\* \* \* \* \*

UNITED STATES PATENT AND TRADEMARK OFFICE
CERTIFICATE OF CORRECTION

PATENT NO. : 9,357,789 B2
APPLICATION NO. : 14/386339
DATED : June 7, 2016
INVENTOR(S) : Wolfhard Kowalski It is certified that error appears in the above-identified patent and that said Letters Patent is hereby corrected as shown below:

In the specification,

Column 7, line 52, "cutting tool 5 with its parallel circular knives 551, 52 of the"

should read "cutting tool 5 with its parallel circular knives 51, 52 of the"

Signed and Sealed this
Second Day of August, 2016

Michelle K. Lee
*Director of the United States Patent and Trademark Office*